(12) United States Patent
Kanei et al.

(10) Patent No.: US 9,267,860 B2
(45) Date of Patent: Feb. 23, 2016

(54) TIRE BALANCE MEASURING DEVICE (71) Applicant: KOBE STEEL, LTD., Hyogo (JP)

(72) Inventors: Naofumi Kanei, Hyogo (JP); Maiko Nakayama, Hyogo (JP); Michiya Kurohashi, Hyogo (JP)

(73) Assignee: Kobe Steel, Ltd., Hyogo (JP)

( * ) Notice: Subject to any disclaimer, the term of this patent is extended or adjusted under 35 U.S.C. 154(b) by 387 days.

(21) Appl. No.: 13/927,979

(22) Filed: Jun. 26, 2013

(65) Prior Publication Data

US 2014/0007679 A1 Jan. 9, 2014

(30) Foreign Application Priority Data

Jul. 3, 2012 (JP) .................................. 2012-149038

(51) Int. Cl.
*G01M 1/06* (2006.01)
*G01M 1/16* (2006.01)
*G01M 1/04* (2006.01)

(52) U.S. Cl.
CPC ................ *G01M 1/16* (2013.01); *G01M 1/045* (2013.01); *G01M 1/06* (2013.01)

(58) Field of Classification Search
CPC ................................. G01M 1/045; G01M 1/06
USPC .................................................... 73/462, 471
See application file for complete search history.

(56) References Cited

U.S. PATENT DOCUMENTS

| 5,383,361 | A | 1/1995 | Matumoto |
| 6,131,455 | A | 10/2000 | Matsumoto et al. |
| 6,308,566 | B1 | 10/2001 | Matsumoto et al. |
| 6,796,035 | B2 | 9/2004 | Jahn et al. |
| 2004/0051864 | A1 | 3/2004 | Braghiroli |

FOREIGN PATENT DOCUMENTS

| JP | 05-240726 A | 9/1993 |
| JP | 11-223570 A | 8/1999 |
| JP | 3133465 B2 | 2/2001 |
| JP | 2004-109132 A | 4/2004 |
| JP | 3904319 B2 | 4/2007 |

OTHER PUBLICATIONS

The extended European search report issued by the European Patent Office on Nov. 20, 2014, which corresponds to European Patent Application No. 13163867.8-1557 and is related to U.S. Appl. No. 13/927,979.

*Primary Examiner* — John Chapman, Jr.
(74) *Attorney, Agent, or Firm* — Studebaker & Brackett PC (57) ABSTRACT

The present invention provides a tire balance measuring device capable of minimizing the influence exerted on a measured value due to an inclination of a lock shaft even when the lock shaft (fitted shaft) is inclined in a random direction at an angle created by a gap corresponding to a fitting allowance every time a tire is supplied with gas. The tire balance measuring device of this invention comprises a sensor for measuring the inclination of the lock shaft, and a computing unit for computing an amount of change in a unbalance of the tire from an output value received from the sensor after the tire is supplied with gas, and correcting a result of measuring a balance of the tire using the computed amount of change in the unbalance.

4 Claims, 5 Drawing Sheets

TIRE BALANCE MEASURING DEVICE

BACKGROUND OF THE INVENTION

1. Field of the Invention

The present invention relates to a tire balance measuring device for measuring a balance of a tire.

2. Description of the Related Art

As devices for measuring a balance of a tire, there has been known a tire balance measuring device having a structure to rotate a tire inserted between two rims that are arranged one above the other. In the thus-structured tire balance measuring device, an upper rim should be completely separated from a lower rim when the tire is attached or detached, to prevent the upper rim from becoming detached due to the pressure of air supplied to the tire at the time of measurement of the balance. To achieve this in the tire balance measuring device, a lock shaft to which the upper rim is attached is inserted to a predetermined level into a fitting hole formed in a spindle to which the lower rim is attached, and fixed to the spindle through engagement therewith (refer to, for example, Japan Patent No. 3904319).

In the devices as described above, a predetermined fitting allowance is provided between the lock shaft and the fitting hole in the spindle to facilitate insertion and withdrawal of the lock shaft into/from the spindle. When the tire is inflated by supplying air into the tire at the time of measurement of the balance, the lock shaft is inclined relative to the fitting hole in the spindle due to the presence of a gap corresponding to the fitting allowance, with the result that the upper rim is accordingly inclined relative to the lower rim. The above-described devices suffer from a problem in that measured values of the balance have an error introduced by an occurrence of the inclination. In addition, because the lock shaft can be inclined in a completely random direction every time the tire is supplied with air, it is difficult to correct for variations in the measured values depending on a direction of the inclination.

To address the problem, Japan Patent No. 3133465 discloses a tire balance measuring device in which three or more contact portions are protrudingly formed on an outer circumferential surface of a fitted shaft (the lock shaft). This Japan Patent further describes that the above-described structure can function to limit the direction in which the fitted shaft is inclined relative to the fitting hole, which makes it possible to make a correction to the measured value.

However, even with the structure described in Japan Patent No. 3133465, the upper rim can not be limited sufficiently for preventing irregular inclination that occurs due to the presence of the fitting allowance between the fitted shaft and the fitting hole. It is assumed, for example, that the tire balance measuring device of the above-described structure includes three contact portions on the outer circumferential surface of the fitted shaft. In this case, the direction in which the fitted shaft can be inclined is toward any midpoint position between the adjacent contact portions, which means that there are three possible directions of inclination of the fitted shaft in total. In which of the three directions the fitted shaft will be inclined when the tire is supplied with air remains unknown until air is actually introduced into the tire.

The present invention, which was made in view of the aforesaid present circumstances, therefore aims to provide a tire balance measuring device in which even when the fitted shaft (a lock shaft) could be inclined in a random direction at an angle created by the gap corresponding to the fitting allowance every time the tire is supplied with air, an influence exerted due to the inclination on the measured value can be minimized.

SUMMARY OF THE INVENTION

The present invention provides a tire balance measuring device for measuring a balance of a tire. The tire balance measuring device comprises a rim rotation supporting shaft vertically and rotatably supported via a bearing by a housing, a lower rim mounted on the rim rotation supporting shaft, a locking shaft inserted into a fitting hole of the rim rotation supporting shaft, an upper rim mounted on the locking shaft and placed above the lower rim, a locking component that allows the locking shaft to be engaged at a desired height with the rim rotation supporting shaft and fixed thereto, at least two sensors that measure an inclination of the locking shaft, and a correction computing unit that computes an amount of change in an unbalance of the tire based on output values received from the sensors after the tire is supplied with gas, and corrects a result of measuring a balance of the tire using the computed amount of change in the unbalance.

According to the present invention, even when the locking shaft is inclined in a random direction at an angle created by a gap corresponding to a fitting allowance every time the tire is supplied with air, the at least two sensors and the correction computing unit can be used to correct, for an influence exerted due to the inclination on a measured value, so that the influence can be minimized. In this way, the balance of the tire can be measured with a higher degree of accuracy than that achieved by a conventional way.

In the thus-structured tire balance measuring device, the correction computing unit may compute, from the output values, an amount by which the inclination of the locking shaft is changed from a reference inclination of the locking shaft and an amount by which eccentricity in a position of center of gravity of the locking shaft equipped with the upper rim is changed from that of the locking shaft having the reference inclination, and calculate the amount of change in the unbalance using the computed amounts.

In the thus-structured tire balance measuring device, the sensors may consist at least of a first sensor for detecting a radial position of the upper rim and a second sensor arranged above the first sensor to detect the radial position of the upper rim.

In the thus-structured tire balance measuring device, the sensors may consist at least of the first sensor for detecting the radial position of the upper rim, a second sensor for detecting an axial position of the upper rim, and a third sensor arranged on a side of the locking shaft opposite to a position of the second sensor to detect the axial position of the upper rim.

DESCRIPTION OF THE PREFERRED EMBODIMENTS

Hereinafter, embodiments for carrying out this invention will be described with reference to the drawings.

First Embodiment (Structure of Tire Balance Measuring Device)

Figure 1:
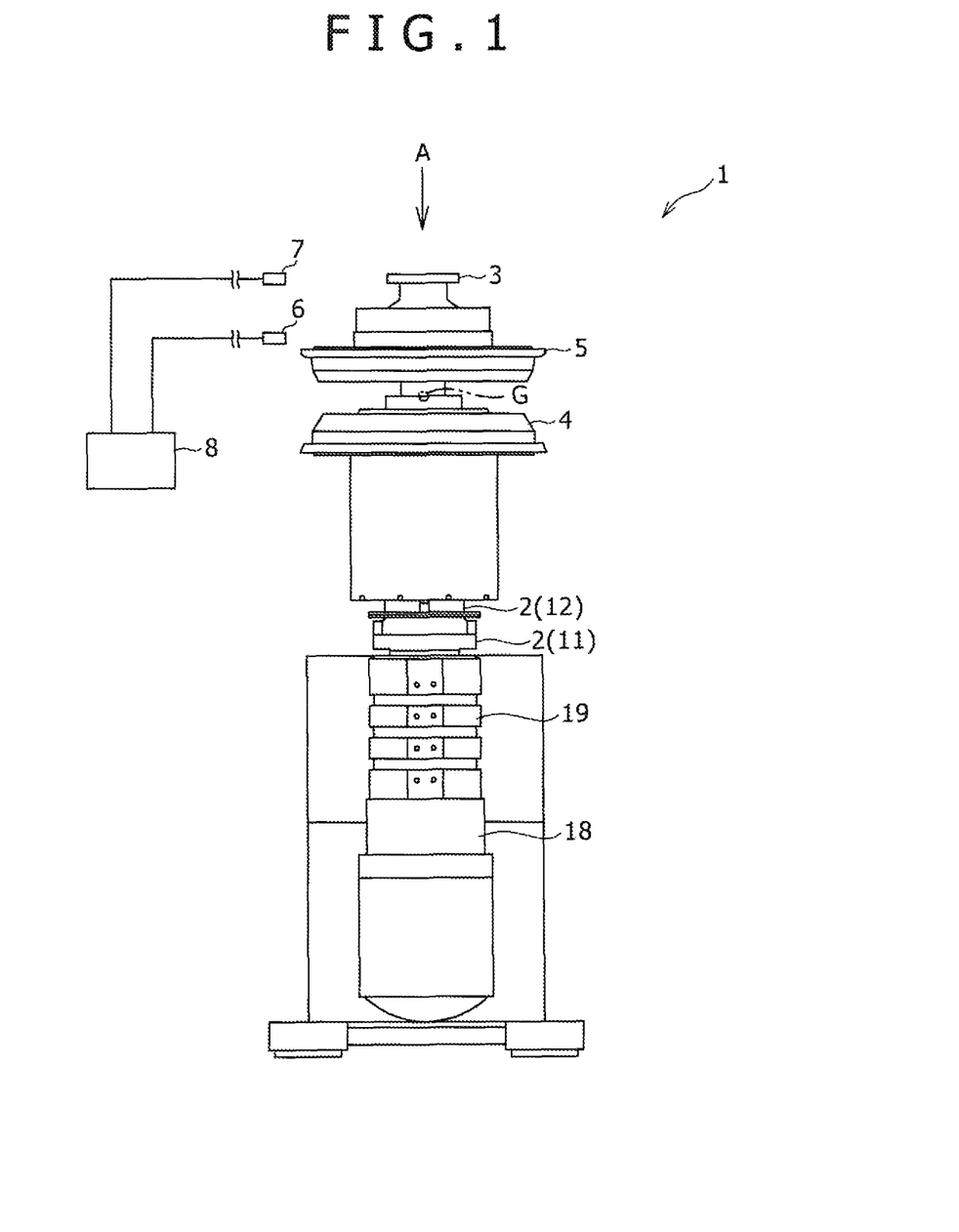
FIG. 1 is a front view of a tire balance measuring device according to a first embodiment of the present invention.
Figure 2:
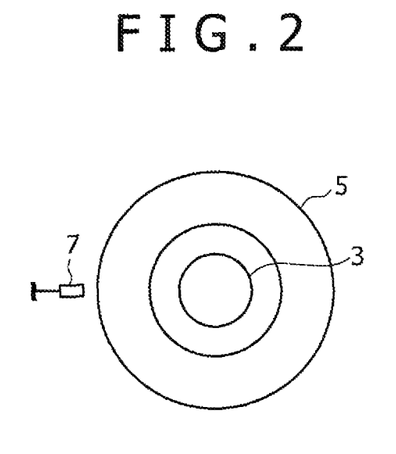
FIG. 2 is a diagram viewed along an arrow A in FIG. 1.
Figure 3:
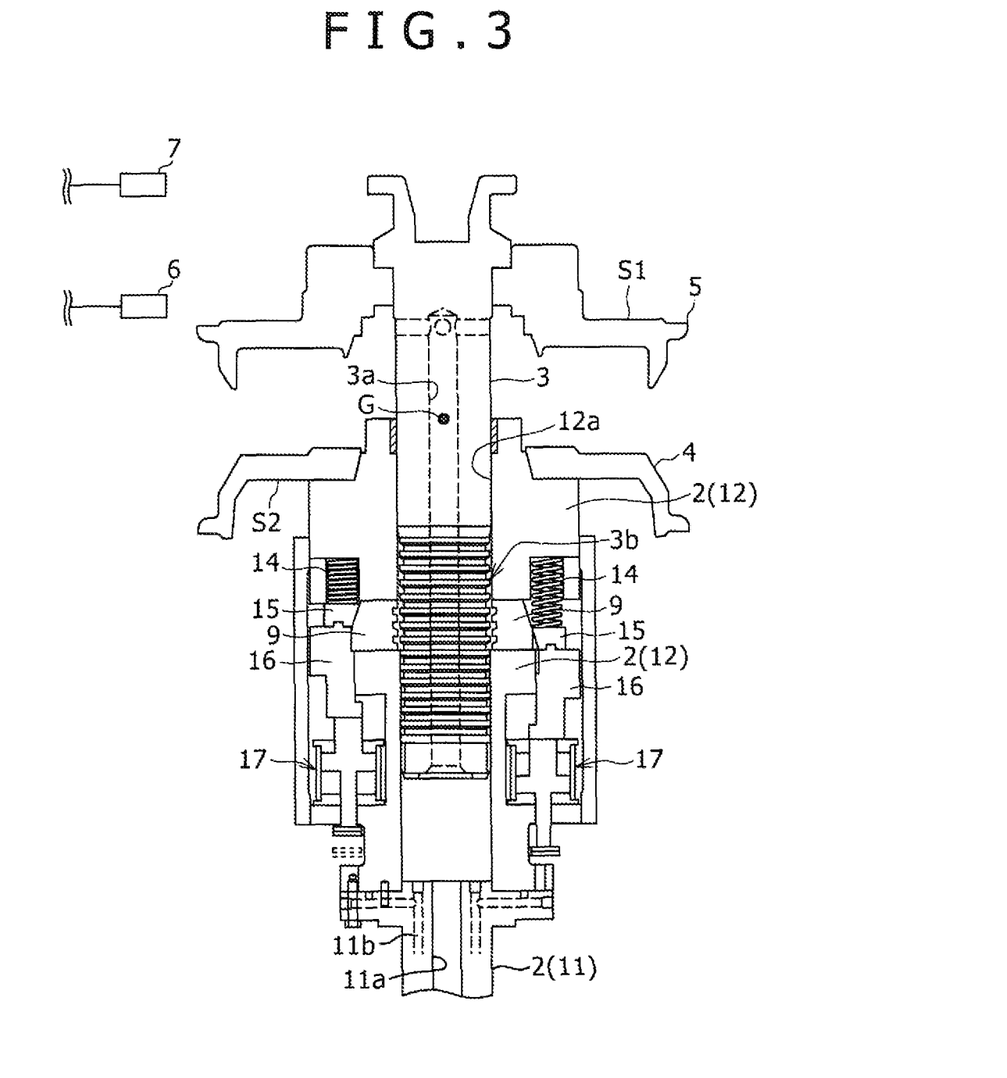
FIG. 3 is a cross sectional view of an upper half portion of the tire balance measuring device shown in FIG. 1.

FIGS. 1 to 3 show a first embodiment of a tire balance measuring device. A tire balance measuring device 1 is designed to hold a tire inserted between an annular lower rim 4 and an annular upper rim 5, and rotate the tire about a vertical axis after air is introduced into the tire to thereby inflate the tire.

The tire balance measuring device 1 includes a spindle 2 having a top end on which the lower rim 4 is mounted, and a lock shaft 3 having a top end on which the upper rim 5 is mounted. The spindle 2 and the lock shaft 3 respectively correspond to a rim rotation supporting shaft and a locking shaft of the present invention. When the lock shaft 3 whose top end is equipped with the upper rim 5 is inserted into a fitting hole 12a of the spindle 2, the tire can be retained between the lower rim 4 and the upper rim 5 in a condition sandwiched therebetween.

After the insertion of the lock shaft 3 into the fitting hole 12a in the spindle 2, the spindle 2 and the lock shaft 3 are engaged and fixed to each other via a plurality of lock pieces 9, to thereby retain (hold) the tire sandwiched between the lower rim 4 and the upper rim 5. The lock piece 9 corresponds to a locking component of this invention.

(Spindle)

The spindle 2 is composed of a cylindrically-shaped lower spindle shaft 11 and a hollow upper spindle shaft 12, which are concentrically connected and fixed to each other. The lower spindle shaft 11 and the upper spindle shaft 12 are arranged in that order from below.

<Lower Spindle Shaft>

The lower spindle shaft 11 is vertically and rotatably supported via bearings (not illustrated) by a spindle housing 19. The spindle housing 19 corresponds to a housing of the present invention. The lower spindle shaft 11 is rotated by a drive motor (not illustrated). The bearings are installed between the lower spindle shaft 11 and the spindle housing 19. An air duct 11a used for supplying an to the tire is formed in a central region of the lower spindle shaft 11 and an air duct 11b used for supplying air to a pneumatic cylinder 17 is formed in the lower spindle shaft 11 on an outer side of the air duct 11a.

A rotary joint 18 is mounted on, a bottom end of the lower spindle shaft 11. Air is introduced and discharged through the rotary joint 18. It should be noted that the introduction and discharge of air is not limited to a manner performed via the rotary joint 18. In addition, a gas other than air may be supplied to the tire, while the pneumatic cylinder 17 may be of a type driven by any gas other than air.

<Upper Spindle Shaft>

The upper spindle shaft 12 includes, at its center, the fitting hole 12a into which the lock shaft 3 is inserted. The lock pieces 9 are retained in an axial intermediate region of the upper spindle shaft 12.

(Lock Shaft)

The lock shaft 3 is a component engaged via the lock pieces 9 with the upper spindle shaft 12 and fixed thereto. In the lock shaft 3, a locking section 3b including a plurality of grooves is formed on an outer circumferential surface of the lock shaft 3 to allow adjustment of a spacing (the width of a tire) between the lower rim 4 and the upper rim 5. The spacing between the lower rim 4 and the upper rim 5 can be adjusted to a desired distance in increments of the pitch of grooves. Further, an air duct 3a used for supplying air to the tire is formed in a central region of the lock shaft 3.

(Lock Pieces)

The lock piece 9 is a component for causing the lock shaft 3 to be engaged at a desired height (in increments of the pitch of grooves in the locking section 3b) with the spindle 2 and fixed thereto. The lock piece 9 can be moved forward and backward in a radial direction of the spindle 2, while being fixed to the spindle 2 in both vertical and rotational directions of the spindle 2.

The forward and backward movement of the lock pieces 9 in the radial direction of the spindle 2 is actuated by a lock piece driving means that includes a fluid-pressure cylinder (the pneumatic cylinder 17 in this embodiment), a connector component 16, a lead piece 15, and a coil spring 14.

(Sensors)

The tire balance measuring device 1 of this embodiment is equipped with first and second sensors 6 and 7 for measuring an inclination of the lock shaft 3 and a computing unit 8 (a correction computing unit) for correcting a result of measuring a balance of a tire. The sensors 6 and 7 may be, for example, laser sensors (the same as sensors in a second embodiment, which will be described below). Note that any measuring instruments for measuring the balance of the tire are not illustrated in the drawings. The following description is provided assuming that the laser sensors are used.

The first sensor 6 is a sensor to detect a radial position (displacement) of the upper rim 5 and installed in the vicinity of the upper rim 5. Here, a vertical position of the upper rim 5 is determined in accordance with the width of the tire. Then, the lock shaft 3 on which the upper rim 5 is mounted is engaged and fixed through the lock pieces 9 to the spindle 2. Then, in the vicinity of the location where the fixed upper rim 5 is positioned, the first sensor 6 is installed, for example.

It should be noted that a condition where the first sensor 6 is installed in the vicinity of the upper rim 5 means, in particular, that a sensor head (a part that houses a light emitting element and a light receiving element) of the first sensor 6 is placed in the vicinity of the upper rim 5 (this is equally applied to all sections referring to any position of the sensor, any distance between the sensors, and the like in the following description).

Also, the second sensor 7 is a sensor to detect the radial position (displacement) of the upper rim 5. The second sensor 7 is installed above the first sensor 6 and separated by a predetermined distance from the first sensor 6. This means that, in the rotational direction of the upper rim 5, the second sensor 7 is arranged at an angular position substantially the same as that of the first sensor 6. In this embodiment, because the second sensor 7 is arranged at the same angular position as the first sensor 6 and on the same radial position as the first sensor 6, the first sensor 6 is hidden beneath the second sensor 7, and thus not shown in FIG. 2. It should be noted that the first sensor 6 and the second sensor 7 may not necessarily be arranged exactly at the same angular position on the same radial position.

(Correction Computing Unit)

Output signals (output values) from the sensors 6 and 7 are input into the computing unit 8 (the correction computing unit) after they are subjected to conversion in the sensors or without being processed. The computing unit 8 is used for computing an amount of change in an unbalance of the tire based on the output values received from the sensors 6 and 7 after the tire is supplied with air, and correcting the result of measuring the balance of the tire by means of the computed amount of change in the unbalance.

(Operation of Tire Balance Measuring Device)

While describing operation of the tire balance measuring device 1, the correction to the result of measuring the balance of the tire will be explained. Note that the operation of the tire balance measuring device 1 is controlled by a not-illustrated control section.

Firstly, the tire is placed on the lower rim 4 attached to the spindle 2. Then, the lock shaft 3 equipped with the upper rim 5 is lowered to a predetermined height at which the upper rim 5 and the lower rim 4 cooperatively hold the tire between the upper and lower rims 5 and 4 while being inserted into the fitting hole 12a in the spindle 2.

After the upper rim 5 is lowered to the predetermined height, the pneumatic cylinder 17 is actuated. The pneumatic cylinder 17 moves the lock pieces 9 via the connector component 16 and the lead piece 15 toward a radial inside to thereby engage the lock shaft 3 and the spindle 2 with each other (secure the lock shaft 3 to the spindle 2).

After that, air is supplied into the tire through the rotary joint 18. When air is supplied to the tire, the tire is inflated, which causes the lock shaft 3 to be slightly lifted up. This ensures that the lock shaft 3 is completely secured (locked) with respect to the spindle 2. When the tire is inflated by introducing air into the tire, the lock shaft 3 is inclined relative to the fitting hole 12a in the spindle 2 at an angle created by a gap corresponding to a fitting allowances (inclined by the gap corresponding to the fitting allowance of the locking section 3b). The inclination occurs in a completely random direction every time the tire is supplied with air. Furthermore, although the maximum amount of inclination of the lock shaft. 3 is defined by a dimension of the fitting allowance of the locking section 3b, a dimension of an allowance between the fitting hole 12a in the spindle 2 and the outer diameter of the lock shaft 3, and others, an actual amount of inclination is variable.

When an air pressure in the tire reaches a predetermined pressure, supply of an to the tire is stopped. Subsequent to this, the tire is rotated, to detect (measure) the balance of the tire.

<Correction to Balance Measurement Result>

Here, when the supply of air to the tire is stopped after the air pressure in the tire reaches the predetermined pressure, a displacement of the lock shaft 3 is measured by the sensors 6 and 7 before the tire is rotated. In a direct way, the displacement of the upper rim 5 (the displaced radial position of the upper rim 5) is measured, by the sensors 6 and 7.

A measured value of the second sensor 7 installed on an upper side is defined as $(e_c, \phi_c)$, and a measured value of the first sensor 6 installed on a lower side is defined as $(e_d, \phi_d)$ where "e" is a displacement amplitude while "$\phi$" is a phase angle. The measured value of the sensor refers to a value obtained by converting the output signal (the output value) of the sensor within the sensor or in the computing unit 8.

The above-described measured values in the sensors 6 and 7 are represented in the form of complex numbers as follows:

$$Z_c = e_c(\cos \phi_c + i \sin \phi_c),$$

$$Z_d = e_d(\cos \phi_d + i \sin \phi_d),$$

where $Z_c$ is the measured value in the second sensor 7, and $Z_d$ is the measured value in the first sensor 6.

Here, data $Z_{c0}$ and $Z_{d0}$ to be used as reference data for $Z_c$ and $Z_d$ are previously acquired and input into the computing unit 8. The reference data denotes, for example, data (measured by the sensors 7 and 6) that is obtained for a tire identical to the object tire under measurement when the lock shaft 3 is not inclined relative to the vertically positioned spindle 2 (i.e. the lock shaft 3 is also vertically positioned). Note that the condition where the lock shaft 3 is not inclined may not necessarily be used as the reference. In other words, the reference inclination of the lock shaft 3 is not limited to just an inclination of 0 degrees relative to the vertical direction.

Taking an amount by which the inclination of the lock shaft 3 is changed from the reference inclination of the lock shaft 3 as $\Delta\theta$, and taking a distance between the second sensor 7 and the first sensor 6 as $l_c$, a relational expression described below can be formed. The value of $l_c$ is previously input into the computing unit 8. From the above relational expression. $\Delta\theta$ is calculated in the computing unit 8 as follows:

$$\Delta\theta = (\Delta Z_c - \Delta Z_d)/l_c,$$

where $\Delta Z_c$ is the amount of change in the measured value of the second sensor 7 $(Z_c - Z_{c0})$, and $\Delta Z_d$ is the amount of change in the measured value of the first sensor 6 $(Z_d - Z_{d0})$.

Taking an amount by which eccentricity in the center of gravity G (a position of center of gravity) of the lock shaft 3 is changed from that of the lock shaft 3 having the reference inclination as $\Delta Z_e$, and taking a distance between the first sensor 6 and the center of gravity G as $l_d$, a relational expression described below can be formed. The value of $l_d$ is previously input into the computing unit 8. From the above relational expression, $\Delta Z_e$ is computed in the computing unit 8. It should be noted that the center of gravity G means the center of gravity of the lock shaft 3 on which the upper rim 5 is mounted, i.e. the center of gravity of the lock shaft 3 including the upper rim 5 (the center of gravity calculated taking into account all components such as the upper rim 5 mounted on the lock shaft 3).

$$\Delta Z_e = \Delta Z_d - l_d \times \Delta\theta$$

Taking an amount of change in a static unbalance of the tire as $\Delta U_e$, and taking an amount of change in a couple unbalance of the tire as $\Delta U_\theta$, a relational expression described below can be formed. The values of m and I are previously input into the computing unit 8. The computing unit computes $\Delta U_e$ and $\Delta U_\theta$ from the relational expression as follows:

$$\Delta U_e = m \times \Delta Z_e,$$

$$\Delta U_\theta = I \times \Delta\theta,$$

where

"m" is a mass of the lock shaft 3 on which the upper rim 5 is mounted (the mass calculated taking into account all components such as the upper rim 5 mounted on the lock shaft 3), and "I" is a moment of inertia of the lock shaft 3 on which the upper rim 5 is mounted (the moment of inertia calculated taking into account all components such as the upper rim 5 mounted on the lock shaft 3).

Taking a distance between the center of gravity G of the lock shaft 3 and an upper correction surface as $l_a$ and taking a distance between the center of gravity G of the lock shaft 3 and a lower correction surface as $l_b$, the amounts of change in the dynamic unbalance $\Delta U_a$ and $\Delta U_b$ at the upper and lower correction positions are respectively calculated in the computing unit 8 from a relational expressions described below. The values of and $l_b$ are previously input into the computing unit 8, $$\Delta U_a = (\Delta U_e \times I_b + I \times \Delta\theta)/(I_a + I_b)$$

$$\Delta U_b = (\Delta U_e \times I_a - I \times \Delta\theta)/(I_a + I_b)$$

Once the dynamic balance of the tire is measured, the computing unit 8 corrects the results ($U_{a0}$ and $U_{b0}$) of measuring the dynamic balances using $\Delta U_a$ and $\Delta U_b$. In this way, even when the lock shaft 3 is inclined in a random direction every time the tire is supplied with air, the influence of the inclination on the measured value can be minimized. Note that the above-described expressions used for finding the amounts of change in the dynamic unbalance $\Delta U_a$ and $\Delta U_b$ can hold for any desired location of the upper and lower correction surfaces. The upper correction surface and the lower correction surface may be by way of illustration such that a flat section S1 of the upper rim 5 is defined as the upper correction surface while a flat section S2 of the lower rim 4 is defined as the lower correction surface, for example (refer to FIG. 3).

(Function/Effect)

The tire balance measuring device 1 includes the first sensor 6 and the second sensor 7 for measuring the inclination of the lock shaft 3, and the computing unit 8 (the correction computing unit) for correcting the result of measuring the dynamic balance of the tire. As has been described by way of illustration, the result of measuring the dynamic balance can be corrected using the two sensors 6 and 7 in conjunction with the computing unit 8, which makes it possible to minimize the influence of the inclination exerted on the measured value even though the lock shaft 3 can be inclined in a random direction every time the tire is supplied with air. In this way, the dynamic balance of the tire can be measured (calculated) with a higher degree of accuracy than that in a conventional way.

Here, the computing unit 8 computes the amount by which the inclination of the lock shaft 3 is changed from the reference inclination and the amount by which eccentricity in the position of center of gravity of the lock shaft 3 equipped with the upper rim 5 is changed from that of the lock shaft 3 having the reference inclination, and calculates the amount of change in the unbalance using the computed amounts. According to this configuration, similarly with the above-described situation, even when the lock shaft 3 is inclined in a random direction every time the tire is supplied with air, the influence exerted on the measurement value due to the fact that the lock shaft 3 is inclined can be minimized by correcting for the influence.

Moreover, the position of the upper rim 5 is detected by the sensors 6 and 7 in this embodiment, and the detected result is used to compute the amount of change in the inclination of the lock shaft 3. When the lock shaft 3 is inclined, a displaced amount of the upper rim 5 is greater than a displaced amount of the lock shaft 3. For this reason, when the amount of change in inclination of the lock shaft 3 is calculated from the displaced amount of the upper rim 5, calculation accuracy is improved. Consequently, the balance of the tire can be measured (calculated) with a further higher degree of accuracy (the same holds for the second embodiment described below).

Second Embodiment

Figure 4:
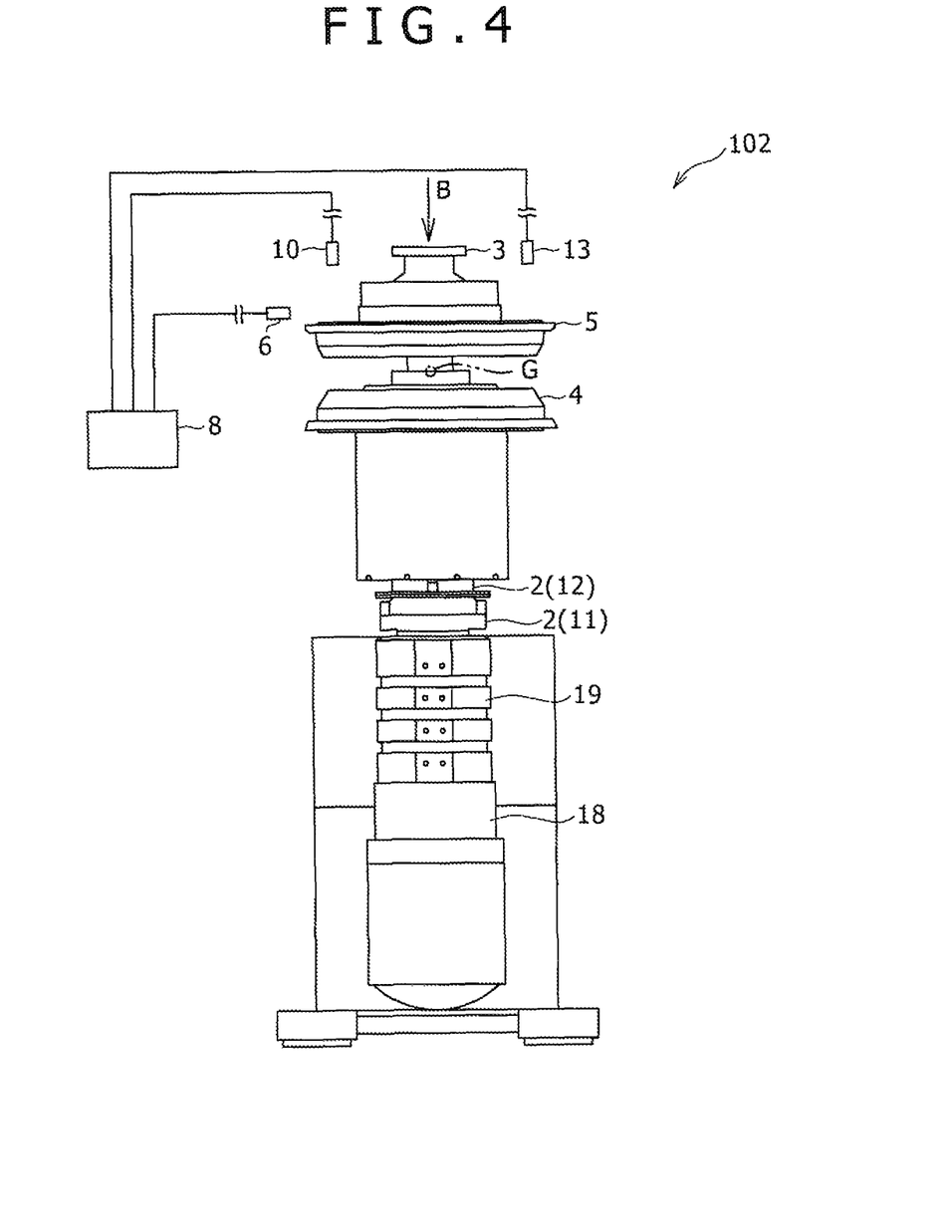
FIG. 4 is a front view of the tire balance measuring device according to a second embodiment of the present invention.
Figure 5:
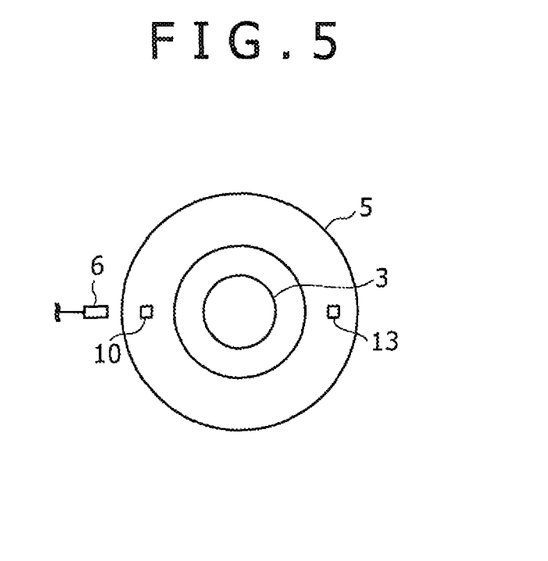
FIG. 5 is a diagram viewed along an arrow B in FIG. 4.

FIGS. 4 and 5 show the second embodiment. The second embodiment differs in the number and placement of the sensors from the first embodiment, and other components are identical to those of the first embodiment. The same components as those of the first embodiment are designated by the same reference numerals as those of the first embodiment.

A tire balance measuring device 102 according to the second embodiment includes three sensors 6, 10, and 13.

The placement of the first sensor 6 is identical to that of the first embodiment. Specifically, the first sensor 6 is the sensor used for detecting the radial position (displacement) of the upper rim 5 and installed in the vicinity of the upper rim 5.

The second sensor 10 is a sensor used for detecting an axial position (displacement) of the upper rim 5. The second sensor 10 is arranged at an angle substantially the same as that of the first sensor 6 in the rotational direction of the upper rim 5. In this embodiment, the second sensor 10 is disposed above an edge of the upper rim 5 at the same angle as that of the first sensor 6 (refer to FIG. 5). Note that the first sensor 6 and the second sensor 10 may not necessarily be at the same angle in the rotational direction of the upper rim 5.

The third sensor 13 is similar to the second sensor 10 and used for detecting the axial position (displacement) of the upper rim 5. The third sensor 13 is disposed on the side of the lock shaft 3 opposite to the position of the second sensor 10. In this embodiment, the second sensor 10 and the third sensor 13 are placed on symmetrical positions about the axis of the lock shaft 3.

<Correction to Balance Measurement Result>

The measured values of the first sensor 6, the second sensor 10, and the third-sensor 13 are defined as $(e_b, \phi_b)$, $(e_c, \phi_c)$, and $(e_d, \phi_d)$, respectively.

The measured values of the first sensor 6 the third sensor 13 may be represented in the form of complex numbers as follows:

$$Z_b = e_b(\cos \phi_b + i \sin \phi_b),$$

$$Z_c = e_c(\cos \phi_c + i \sin \phi_c),$$

$$Z_d = e_d(\cos \phi_d + i \sin \phi_d),$$

where $Z_b$ is the measured value of the first sensor 6 $Z_c$ is the measured value of the second sensor 10 and $Z_d$ is the measured value of the third sensor 13.

Taking the amount by which the inclination of the lock shaft 3 is changed from the reference inclination of the lock shaft 3 as $\Delta\theta$, and taking a distance between the second sensor 10 and the third sensor 13 as $l_c$, a relational expression described below can be formed. Values of $l_c$, $Z_{c0}$, and $Z_{d0}$ are previously input into the computing unit 8. From the relational expression, $\Delta\theta$ is calculated in the computing unit 8 as follows:

$$\Delta\theta = (\Delta Z_c - \Delta Z_d)/l_c,$$

where $\Delta Z_c$ is the amount of change in the measured value of the second sensor 10 $(Z_c - Z_{c0})$, $\Delta Z_d$ is the amount of change in the measured value of the third sensor 13 $(Z_d - Z_{d0})$, $Z_{c0}$ is measurement data of the position of the upper rim 5 used as the reference for the second sensor 10, and $Z_0$ is measurement data of the position of the upper rim 5 used as the reference for the third sensor 13.

Taking the amount by which eccentricity in the center of gravity G (position of center of gravity) of the lock shaft 3 is changed from that of the lock shaft 3 having the reference inclination as $\Delta Z_e$, and taking a distance between the first sensor 6 and the center of gravity G as $l_b$, a relational expression described below can be formed. Values of $l_b$ and $Z_{b0}$ are previously input into the computing unit 8. From the relational expression, $\Delta Z_e$ is computed in the computing unit 8 as follows:

$$\Delta Z_e = \Delta Z_b - l_b \times \Delta\theta,$$

where $\Delta Z_b$ is the amount of change in the measured value of the first sensor 6 $(Z_b - Z_{b0})$, and $Z_{b0}$ is measurement data of the position of the upper rim 5 used as the reference for the first sensor 6.

Subsequent calculations are the same as those in the first embodiment, and descriptions related to the calculations will not be repeated. When the dynamic balance of the tire is measured, the computing unit 8 corrects the result of measuring the dynamic balances $(U_{a0}, U_{b0})$, as in the case with the first embodiment, using the amounts of change in the dynamic unbalance $\Delta U_a$ and $\Delta U_b$.

(Function and Effect)

Here, in some cases, only one sensor may be placeable in the axial direction of the lock shaft 3 (on the side of the lack shaft 3) due to limited space. In another case, even if there is barely enough space to arrange two sensors on the side of the lock shaft 3, the distance ($l_c$) might not be adequately secured between the two sensors. When the adequate distance $l_c$ can not be maintained, the resultant calculation of the amount of change in dynamic unbalance of the tire is affected by a margin of error in the value $l_c$.

In the second embodiment, the sensor that should be arranged along the axial direction of the lock shaft 3 (on the side of the lock shaft 3) may be only one sensor, i.e. the first sensor 6. This ensures that precise measurement (calculation) of the dynamic balance of the tire can be achieved without any trouble in the tire balance measuring device 102 of the second embodiment even when there is substantially no space to arrange more than one sensor on the side of the lock shaft 3.

Although the embodiments of the present invention have been described above, the present invention is not limited to the above-described embodiments. It is to be understood that the present invention may be embodied with various changes and modifications without departing from the scope of the appended claims.

What is claimed is:

1. A tire balance measuring device, comprising:
   a rim rotation supporting shaft vertically and rotatably supported via a bearing by a housing;
   a lower rim mounted on the rim rotation supporting shaft;
   a locking shaft inserted into a fitting hole in the rim rotation supporting shaft;
   an upper rim mounted on the locking shaft and arranged above the lower rim;
   a locking component for causing the locking shaft to be engaged at a desired height with the rim rotation supporting shaft and fixed thereto;
   at least two sensors for measuring an inclination of the locking shaft, and
   a correction computing unit for computing an amount of change in an unbalance of a tire based on an output value received from the sensors after the tire is supplied with gas, and correcting a result of measuring a balance of the tire using the computed amount of change in the unbalance.

2. The tire balance measuring device according to claim 1, wherein the correction computing unit computes an amount by which the inclination of the locking shaft is changed from a reference inclination of the locking shaft and an amount by which eccentricity in a position of center of gravity of the locking shaft equipped with the upper rim is changed from that of the locking shaft having the reference inclination, and calculates the amount of change in the unbalance using a result of the computation.

3. The tire balance measuring device according to claim 1, wherein the sensors are composed at least of:
   a first sensor to detect a radial position of the upper rim, and
   a second sensor arranged above the first sensor to detect the radial position of the upper rim.

4. The tire balance measuring device according to claim 1, wherein the sensors are composed at least of:
   a first sensor to detect a radial position of the upper rim,
   a second sensor to detect an axial position of the upper rim, and
   a third sensor arranged on a side of the locking shaft opposite to a position of the second sensor to detect the axial position of the upper rim.

* * * * *